Figure 1:
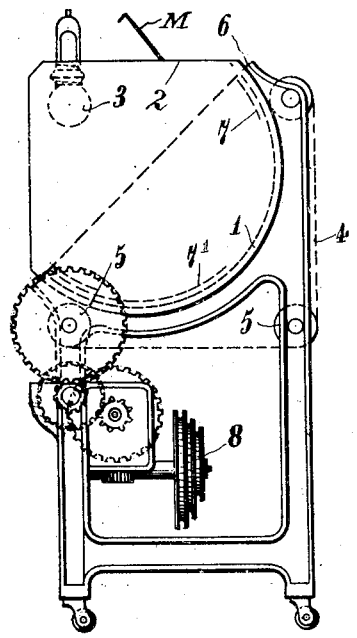

H. WIEGAND.
LIGHT PRINTING APPARATUS.
APPLICATION FILED MAY 29, 1909.

1,086,966.

Patented Feb. 10, 1914.

2 SHEETS—SHEET 1.

Witnesses:
H C Hunsberger
C M Crawford

Inventor:
Heinrich Wiegand
by: B. Singer
Attorney

H. WIEGAND.
LIGHT PRINTING APPARATUS.
APPLICATION FILED MAY 29, 1909.

1,086,966.

Patented Feb. 10, 1914.

2 SHEETS—SHEET 2.

Witnesses:

Inventor:
Heinrich Wiegand
per: Singer
Attorney.

UNITED STATES PATENT OFFICE.

HEINRICH WIEGAND, OF DORTMUND, GERMANY.

LIGHT-PRINTING APPARATUS.

1,086,966.

Specification of Letters Patent.

Patented Feb. 10, 1914.

Application filed May 29, 1909. Serial No. 499,100.

*To all whom it may concern:*

Be it known that I, HEINRICH WIEGAND, a subject of the German Emperor, and residing at 15 Bornstrasse, Dortmund, Germany, have invented certain new and useful Improvements in Light-Printing Apparatus, of which the following is a specification.

This invention relates to machines for making photographic prints and is of that kind in which the drawing, negative tracing or transparent original to be reproduced, and the sensitized print paper, or sheet, are pressed in proper relation against a transparent cylindrical segment adapted to present its concave face to a centrally-arranged source of light, and are caused to travel along the convex surface while exposed to the light, by a traveling belt or band.

The primary object of the invention is to make an arrangement capable of causing such portions of the sensitized sheet, as are moving near the source of light, to be exposed less long than other portions of the sheet more distant from the source of light, thereby insuring a uniform illumination of all portions of the sensitized sheet.

Another object of the invention is to avoid the moving to and fro of the sources of light during the operation, and to dispense with the use of mercury vapor lamps as sources of light, such lamps being difficult to handle.

Figure 2:
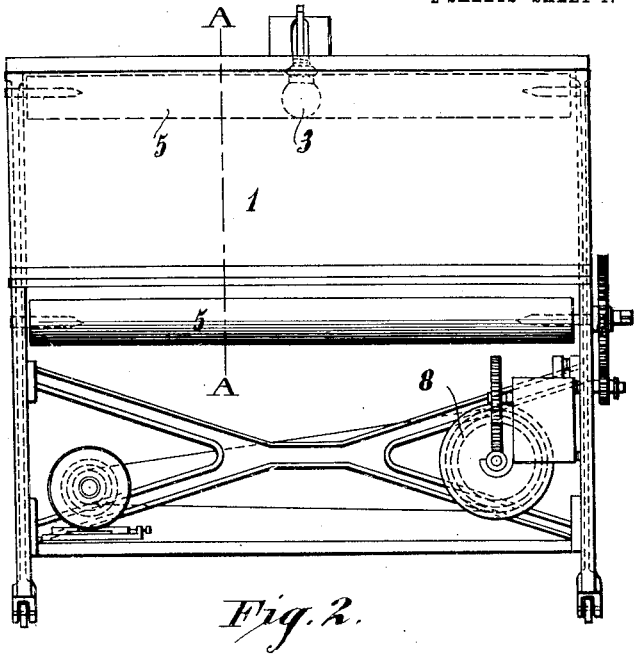
Figure 3:
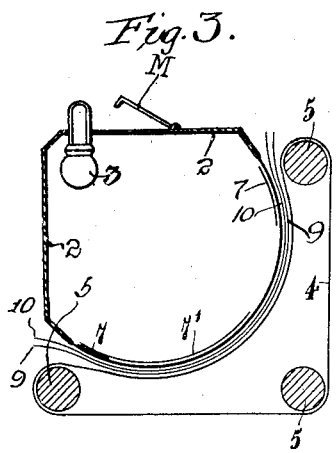
Figure 4:
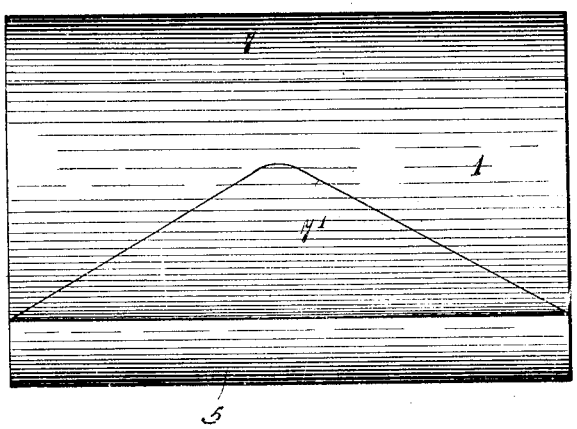
Figure 5:
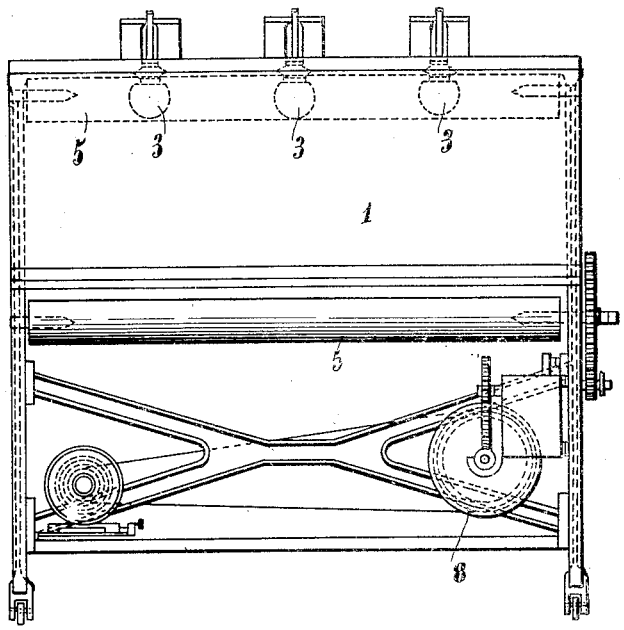
Figure 6:
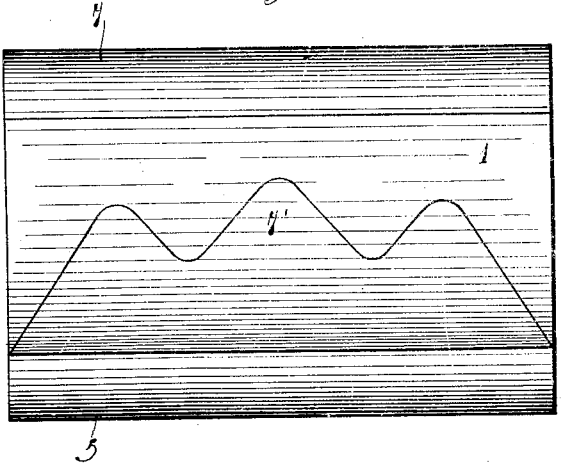

In the accompanying drawings, consisting of two sheets: Figure 1 is an end view, and Fig. 2 a front view of the machine. Fig. 3 shows a detail section along the section-line A—A in Fig. 2 of one form of the arrangement embodying the invention. Fig. 4 shows in plan view the inner face of the transparent segment. Fig. 5 a front view showing a variation of the machine, in which several sources of light are used. Fig. 6 shows in plan view the inner face of the transparent segment for a machine having a plurality of light sources.

Like letters of reference refer to like parts in the several figures.

1 represents a transparent cylindrical segment covered by a removable lid or cover 2, which is formed as a reflector or screen. One or more sources of light 3 are arranged under the cover 2, so that no rays of light can pass to the outside. An outlet for air, heated by the lamp 3, and for observing the work of the apparatus, is provided by an opening which is arranged in the cover 2, which opening can be closed by a hinged flap M. An endless conveyer 4 is arranged so as to contact with and conform to the convex surface of the transparent segment by reason of the location of the friction-rolls 5. Two of these rolls are arranged in close proximity to the segment at its upper and lower edge respectively. The roll arranged near the lower edge of the segment is secured to a gear wheel which is operated by power transmitted thereto by means of gear wheels and of a worm-wheel from a pulley cone 8 journaled in suitable bearings in the frame of the machine.

Cover plates 7 are arranged upon the concave surface of the segment near its edges for the purpose of preventing the light-rays falling upon the segment near its upper and lower edges from meeting the sensitized paper. This arrangement is capable of remedying the defect of reproducing distorted prints. The cover-plates 7 may be fixed upon the segment, as shown in Figs. 4 and 6.

When artificial illumination by means of one lamp 3 is employed, an adjustable cover-plate $7^1$ is mounted upon the concave surface of the cylindrical segment 1. This cover has a triangular shape shown in Fig. 4. The point of the triangle is arranged near the source of light. The portions of the sensitized sheet which pass under the point of the triangle-shaped cover plate are exposed to the illumination less long than the portions of the same moving under the sides of the triangle. The result of this operation consists in producing a uniform effect of the illumination at all points of the sensitized sheet 9 arranged beneath the transparent original 10 (Fig. 3).

When several artificial sources of light 3 are employed (shown in Fig. 5), a cover plate $7^1$ is used which has as many triangular shaped projections as there are sources of light (see Fig. 6). The edge of this cover-plate $7^1$ has a zigzag-form.

What I claim as my invention and desire to secure by Letters Patent is:—

1. In a photographic printing machine the combination with a transparent exposing cylindrical segment, means for advancing the sensitized sheet and pressing it against the convex side of the said cylindrical segment, and an artificial source of light on the concave side of the segment, of a screen by which the illuminating effect of the source of light is distributed over the sensitized paper in such a way that the portions of said paper near the source of light are exposed to the illumination less long than the portions of the paper passing more distant from the source of light, substantially as described and for the purpose set forth.

2. In a photographic printing machine, the combination with a transparent exposing cylindrical segment, means for advancing the sensitized sheet and pressing it against the convex side of said cylindrical segment, and an artificial source of light on the concave side of the segment, of a cover plate placed upon the concave surface of the said cylindrical segment and having at its edge a pointed projection, the point of which is arranged near the source of light, and the edges of which diverge from the point, substantially as described and for the purpose set forth.

3. In a photographic printing machine, the combination with a transparent exposing cylindrical segment, means for advancing the sensitized sheet and pressing it against the convex side of said cylindrical segment, and several artificial sources of light on the concave side of the segment, of a cover plate placed upon the concave surface of the said cylindrical segment and having several tooth-shaped projections, the points of which are arranged near the sources of light, substantially as described and for the purpose set forth.

In witness whereof I have hereunto set my hand in presence of two witnesses.

HEINRICH WIEGAND. [L. S.]

Witnesses:
OTTO KÖNIG,
C. J. WRIGHT.

---

Copies of this patent may be obtained for five cents each, by addressing the "Commissioner of Patents, Washington, D. C."